US010939167B2

United States Patent
Chao (10) Patent No.: US 10,939,167 B2
(45) Date of Patent: Mar. 2, 2021

(54) DYNAMIC RESOURCE ALLOCATION OF MULTIMEDIA CONTENT BASED ON USAGE PATTERNS

(71) Applicant: PIKSEL, INC., Wilmington, DE (US)

(72) Inventor: Gerald C. Chao, Wilmington, DE (US)

(73) Assignee: PIKSEL, INC, Wilmington, DE (US)

( * ) Notice: Subject to any disclaimer, the term of this patent is extended or adjusted under 35 U.S.C. 154(b) by 372 days.

(21) Appl. No.: 15/266,891

(22) Filed: Sep. 15, 2016

(65) Prior Publication Data
US 2017/0078346 A1 Mar. 16, 2017

Related U.S. Application Data

(60) Provisional application No. 62/219,010, filed on Sep. 15, 2015.

(51) Int. Cl.
| | |
|---|---|
| H04N 21/45 | (2011.01) |
| H04N 21/442 | (2011.01) |
| H04N 21/2343 | (2011.01) |
| H04N 21/466 | (2011.01) |
| H04N 21/2662 | (2011.01) |
| H04L 29/08 | (2006.01) |
| H04L 29/06 | (2006.01) |
| H04N 21/4335 | (2011.01) |
| H04N 21/432 | (2011.01) |

(52) U.S. Cl.
CPC ..... *H04N 21/4532* (2013.01); *H04L 67/2823* (2013.01); *H04L 67/2847* (2013.01); *H04N 21/23439* (2013.01); *H04N 21/2662* (2013.01); *H04N 21/44204* (2013.01); *H04N 21/4516* (2013.01); *H04N 21/4668* (2013.01); *H04L 65/4084* (2013.01); *H04L 65/60* (2013.01); *H04L 65/80* (2013.01); *H04L 67/22* (2013.01); *H04N 21/4325* (2013.01); *H04N 21/4335* (2013.01)

(58) Field of Classification Search
CPC . H04L 65/4092; H04L 65/60; H04L 67/2847; H04L 67/2823; H04N 21/234363; H04N 21/4532; H04N 21/23439; H04N 21/251; H04N 21/44222; H04N 21/252; H04N 21/2662; H04N 21/4516; H04N 21/4668; H04N 21/44204
See application file for complete search history.

(56) References Cited

U.S. PATENT DOCUMENTS

8,613,023 B2 * 12/2013 Narahara ............... H04H 60/31
725/46
9,326,046 B1 * 4/2016 Park ................... H04N 21/8456
(Continued)

*Primary Examiner* — Gregory G Todd
(74) *Attorney, Agent, or Firm* — Holzer Patel Drennan (57) ABSTRACT

There is disclosed a multimedia processing method comprising: converting multimedia items into versions of multiple compression levels for storage within a media catalog; and estimating the likelihood of a user consuming each multimedia item based on a consumption history of items within said media catalog and said user; computing the multimedia items to be downloaded and a per-item compression level in dependence on resource constraints at a client device of said user and said estimated consumption likelihoods; downloading a compressed version of the multimedia items; and storing a record of consumed downloaded items.

16 Claims, 3 Drawing Sheets

(56) References Cited

U.S. PATENT DOCUMENTS

| | | | | |
|---|---|---|---|---|
| 2002/0194601 A1* | 12/2002 | Perkes | .............. | G06F 17/30867 |
| | | | | 725/44 |
| 2007/0130585 A1* | 6/2007 | Perret | ................ | H04N 7/17318 |
| | | | | 725/46 |
| 2008/0242280 A1* | 10/2008 | Shapiro | ............ | H04N 21/25891 |
| | | | | 455/414.3 |
| 2009/0017860 A1* | 1/2009 | Cole | ................ | H04W 52/0261 |
| | | | | 455/522 |
| 2013/0198261 A1* | 8/2013 | Matas | .................... | G06T 11/60 |
| | | | | 709/203 |
| 2013/0238761 A1* | 9/2013 | Raleigh | ................ | H04L 67/306 |
| | | | | 709/219 |
| 2014/0156863 A1* | 6/2014 | Gao | .................... | H04L 65/4084 |
| | | | | 709/231 |
| 2014/0279852 A1* | 9/2014 | Chen | ................ | G06F 17/30023 |
| | | | | 707/609 |
| 2014/0289225 A1* | 9/2014 | Chan | .................. | H04L 67/1095 |
| | | | | 707/722 |
| 2014/0368734 A1* | 12/2014 | Hoffert | ................ | H04N 5/4403 |
| | | | | 348/564 |
| 2015/0082328 A1* | 3/2015 | Bradley | ............. | H04N 21/2543 |
| | | | | 725/2 |
| 2015/0245105 A1* | 8/2015 | Wickenkamp | .......... | G06F 16/70 |
| | | | | 725/44 |
| 2016/0119404 A1* | 4/2016 | Bowen | .................... | H04L 67/06 |
| | | | | 709/217 |
| 2016/0191664 A1* | 6/2016 | Balakrishnan | ........ | H04L 67/306 |
| | | | | 709/203 |
| 2016/0360282 A1* | 12/2016 | Graham | ............. | H04N 21/2541 |
| 2018/0041809 A1* | 2/2018 | Chang | ............. | H04N 21/47217 |

\* cited by examiner

DYNAMIC RESOURCE ALLOCATION OF MULTIMEDIA CONTENT BASED ON USAGE PATTERNS

CROSS REFERENCE TO RELATED APPLICATION

The present application claims benefit of priority to U.S. Provisional Patent Application No. 62/219,010, entitled "Dynamic Resource Allocation of Multimedia Content on Usage Patterns" and filed on Sep. 15, 2015, which is specifically incorporated by reference herein for all that it discloses or teaches.

FIELD OF THE DISCLOSURE

The present disclosure relates to the processing of multimedia streams, and more specifically, an efficient and robust method to allocate resources for transferring multimedia streams for subsequent viewing.

BACKGROUND

With the advent of on-demand video services, where multimedia content such as video and audio is delivered over computer networks starting when users initiate the consumption of that content. However, there are situations where the content may not immediately consumed, such as onto personal video recorders (PVRs) or mobile devices so the content can be either consumed at a later time, or when network access is limited or unavailable, also known as off-line access.

In such situations where multimedia content is not immediately consumed, there are three primary resources needed to transfer, store, and playback the content, in the form of bandwidth, storage, and computational resources, respectively. In this resource-constrained environment, the trade off is between increasing the compression of the multimedia content to reduce the resources needed to transfer, store, and playback of the content, at the expense of the video quality. Conversely, if these resources are not constrained, one would simply keep compression to a minimum to preserve quality, at the expense of larger media files and thus increasing required resources.

There are three groups of existing approaches to manage this resource constraint. One group is to transmit high quality, large media files to the client, and re-compress the content on the client as the need arises, such as to free up storage on PVRs. The disadvantage of the approach is the inefficiencies, including the high bandwidth needed during the transfer phase, storage for the large files, and the expensive computational cost for re-compressing the content on the client.

A second group is to choose the compression level of the media files prior to downloading, usually based on the capabilities of the client devices, or user preferences. For example, PVRs would receive the lowest compression to maintain highest quality, whereas tablets would be medium, and mobile phones would have the highest compression. This approach does reduce the bandwidth requirement during the transfer phase, as well as lowering the storage requirement. However, a ceiling is put on the quality of the content, effectively meaning the user would have sub-par experience if the content is viewed on devices more capable than the one the content is downloaded to, such as viewing media files on tablets or mobile phones on a TV.

The third group takes a hybrid approach of selecting the compression level based on user behavior, such as choosing a higher quality version if the user is consuming the content versus only recording for later viewing, mainly in the PVR use case. While this approach can reduce the resources for bandwidth and storage, the quality for the recorded shows would always be degraded.

A need exists, therefore, for an improved method for the transfer, storage, and playback of multimedia on client devices that maximizes the playback quality, while minimizing the bandwidth, storage, and computational resource required. In doing so, the users would either wait less for the same amount of multimedia content to be transferred, or get more content transferred given the same amount of time and storage, without trading off for content quality.

The prior art is discussed in a number of U.S. patent publications, summarised as follows.

U.S. Pat. No. 5,371,551—discloses an original "circular buffer" technique for recording broadcast streams to storage devices. Does not adjust compression of media content, but merely delete old ones to make space.

U.S. Pat. No. 5,977,964—uses predictive analytics to prompt users to record shows they likely to watch, and does not adjust compression ratio for maximizing storage utilization.

U.S. Pat. No. 6,092,119—describes complex video compression system for easy previewing and creating compressed video files from analog video, but does not address how to determine the amount of compression to apply to which video.

U.S. Pat. No. 6,442,327—describes a two tiered storage system for video, where the first is a buffer storage and second is a larger capacity storage. This is a more complex solution than a system with just one storage device.

U.S. Pat. No. 6,614,987—describes a method for automatically record shows based on user preferences, and delete shows not watched. The user preferences are used to prioritize which recordings to delete when more space is needed, but not by adjusting the compression ratio.

U.S. Pat. No. 7,046,805—describes receiving encrypted streams into storage device, and decrypting onto another part of the storage device, and therefore is a two step process that requires more computational resources.

U.S. Pat. No. 7,200,859—describes live compression of uncompressed videos for buffered viewing, and therefore does not address space allocation for recordings.

U.S. Pat. No. 7,961,643—describes reducing bit rate of videos if users are not currently watching and only recording and therefore always makes for poorer quality videos for recorded videos.

U.S. Pat. No. 8,189,472—describes selecting compression of media stream based on resolution of display device, and requires bandwidth to be allocated and sustained once the stream is chosen. It does not address storage of the media streams.

U.S. Pat. No. 8,291,461—describes giving users the options to choose a lower bandwidth option for on-demand media, and requires users to make the decision. Therefore, it demands more work than automated solutions.

U.S. Pat. No. 8,351,765—describes deleting recordings based on viewer consumption history, but does not adjust compression ratio to maximize storage utilization.

U.S. Pat. No. 8,380,041—describes saving specific items onto a portable storage device, and requires manual selection of which items to transfer onto portable device. Therefore it demands more work than automated systems.

U.S. Pat. No. 8,572,272—describes management of media downloading based on consumption patterns, mostly based on linearity or continuation of partially-consumed content. Does not address new titles that have no previous consumption patterns, and does not adjust compression ratio to maximize storage utilization.

U.S. Pat. No. 8,582,946—describes storing media locally and optionally on server-side if local device does not have sufficient storage resources. Tradeoff is the media on server-side is not viewable if the users do not have network access.

U.S. Pat. No. 8,813,122—describes automatic selection of a subset of programs to record based on user profile. Tradeoff is when users want to watch programs outside of their typical routine, and does not adjust compression ratio to maximize storage utilization.

EP1646048A2—describes management of video stored on slow archival medium with high performance storage like disk drives, but does not adjust compression ratio to maximize storage utilization.

EP1425907A2—describes a system for presenting users with media selections and subsequent recording onto a secured portable storage medium, which is a manual process and therefore demands more work than automated approaches.

Also WO2003051044—describes a method to buffer video streams and estimating available storage space on recording device, but does not adjust compression ratio to maximize storage utilization.

SUMMARY OF THE INVENTION

The present invention is centered around the insight that the resource allocation can be determined dynamically based on the likelihood of consumption of the individual multimedia content. That is, the more likely a user would consume a piece of content, the higher the quality version is transferred to the user's device. Conversely, if the user is less likely to consume a piece of content, a more compressed version and thus smaller file is transferred. In doing so, the users would enjoy high quality versions of their favorite programs, while still given the choice of additional titles to consume if the users either finished consuming their favorites or would like to explore outside of them.

In using the likelihood of consumption to determine resource allocation, the present invention minimizes the trade off between multimedia quality and resource utilization. Further, depending on the context of the users, the present invention can adapt to the most limiting resource, whether it's bandwidth, storage, or computational resources, and dynamically choose the versions of the multimedia files to optimize for the constraint. Therefore, this invention provides a method for which the users can maximize the quality and the selection of their multimedia content on their devices, while reducing the overall resources needed to deliver, store, and playback the content compared to the existing art.

In one aspect the invention provides a multimedia processing method comprising: converting multimedia items into versions of multiple compression levels for storage within a media catalog; and estimating the likelihood of a user consuming each multimedia item based on a consumption history of items within said media catalog and said user; computing the multimedia items to be downloaded and a per-item compression level in dependence on resource constraints at a client device of said user and said estimated consumption likelihoods; downloading a compressed version of the multimedia items; and storing a record of consumed downloaded items.

Converting the multimedia items into versions of multiple compression levels may comprise: determining a set of multimedia resolutions suitable for the intended devices; determining a set of data rates suitable for the network bandwidth of the users; and creating a compressed version of each input multimedia item into said media catalog with each combination of resolution and data rate.

Estimating the likelihood of a user consuming each multimedia item comprises: collecting a consumption history of multimedia items by individual users; and generating a score for every combination of an item and a user of the system based on said consumption history.

Generating a score may further comprise computing a number of times each item was consumed.

Generating a score may further comprise computing a score for each item based on how similar the consumption history of each user is to the consumption history of other users.

Generating a score may further comprise computing a score for each item based on how similar the consumption history of each item is to the consumption history of other items within said media catalog.

Generating a score may further comprise computing how similar each item is to other items within said media catalog.

Generating a score may further comprise computing a single likelihood by combing said score based on number of times each item was consumed, said score based on how similar the consumption history of each user to other users, said score based on how similar the consumption history of each item to items, and said score based on how similar each item is to other items.

The method may further comprise determining the resource constraints by: collecting the maximum storage available on a client device of a user; and estimating the maximum bandwidth available on said client device of said user.

Determining the resource constraints may further comprise: collecting the battery level available on a client device of a user.

Computing the multimedia items to be downloaded and the compression level may comprise: converting resource constraints into a downloading limit; converting for each item, the compression version, and the user's consumption likelihood of said item, into a score via a cost function; and evaluating all combination of said score for items and versions to maximize the number of items to download while being within the said downloading limit.

Downloading the multimedia item may further comprise: determining the items and which compressed versions of each multimedia item to download; and downloading from said multimedia catalog for said items and versions.

The method may further comprise storing the downloaded item(s) into local storage of client device of the user. The method may further comprise playing back the downloaded item(s).

In an aspect there is also provided a non-transitory computer medium for storing computer program code which, when executed on a computer, performs a method of converting multimedia items into versions of multiple compression levels for storage within a media catalog; and estimating the likelihood of a user consuming each multimedia item based on a consumption history of items within said media catalog and said user; computing the multimedia items to be downloaded and a per-item compression level in dependence on resource constraints at a client device of said user and said estimated consumption likelihoods; downloading a compressed version of the multimedia items; and storing a record of consumed downloaded items.

In another aspect there is provided a multimedia processing device comprising: a module for converting multimedia items into versions of multiple compression levels for storage within a media catalog; a module for estimating the likelihood of a user consuming each multimedia item based on a consumption history of items within said media catalog and said user; computing the multimedia items to be downloaded and a per-item compression level in dependence on resource constraints at a client device of said user client device and said estimated consumption likelihood; downloading a compressed version of the multimedia items; a store for storing a record of consumed downloaded items.

The module for converting the multimedia items into versions of multiple compression levels may comprise: a module for determining a set of multimedia resolutions suitable for the intended devices; a module for determining a set of data rates suitable for the network bandwidth of the user; and a module for creating a compressed version of each input multimedia item into said media catalog with each combination of resolution and data rate.

The module for estimating the likelihood of a user consuming each multimedia item may comprise: a module for collecting a consumption history of multimedia items by individual users; and a module for generating a score for every combination of an item and a user of the system based on said consumption history.

The module for generating a score may further comprise a module for computing number of times each item was consumed.

The module for generating a score may further comprise a module for computing a score for each item based on how similar the consumption history of each user is to the consumption history of other users.

The module for generating a score may further comprise a module computing a score for each item based on how similar the consumption history of each item is to the consumption history of other items within said media catalog.

A module for generating a score may further comprise a module for computing how similar each item is to other items within said media catalog.

A module for generating a score may further comprise a module for computing a single likelihood by combing said score based on number of times each item was consumed, said score based on how similar the consumption history of each user to other users, said score based on how similar the consumption history of each item to items, and said score based on how similar each item is to other items.

A module for estimating may be further configured to determine the resource constraints by further comprising: a module for collecting the maximum storage available on a client device of a user; and a module for estimating the maximum bandwidth available on said client device of said user.

The module for estimating may further comprise: a module for collecting the battery level available on a client device of a user.

The module for estimating may further comprise a module for converting resource constraints into a downloading limit; a module for converting for each item, the compression version, and the user's consumption likelihood of said item, into a score via a cost function; and a module for evaluating all combination of said score for items and versions to maximize the number of items to download while being within the said downloading limit.

The device may further comprise a module for determining the items and which compressed versions of each multimedia item to download; and a module for downloading from said multimedia catalog for said items and versions.

The device may further comprise a store for storing the downloaded item(s) into local storage of client device of the user.

The device may further comprise a playback module for playing back the downloaded item(s).

DETAILED DESCRIPTION

Figure 1:
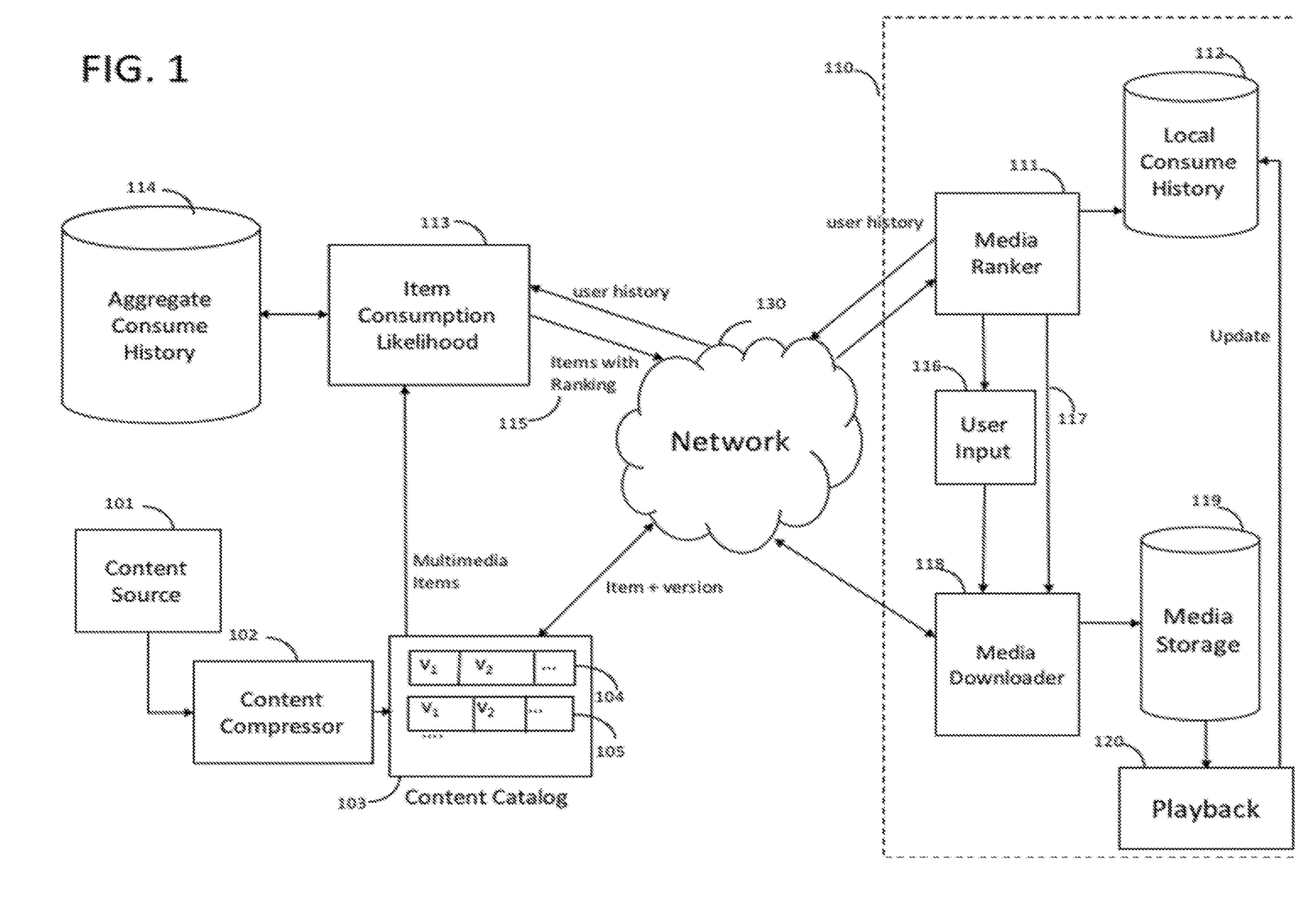
FIG. 1 is an exemplary schematic which represents the overall functionality of the present invention.

FIG. 1 illustrates in schematic form the manner in which information is processed in an example in accordance with the invention. As will be described in more detail below, some of the structures and functions illustrated in FIG. 1 represent optional functionality that need not be present in all implementations of the invention.

A multimedia asset is provided by a content source denoted by reference numeral 101 in its original "master" format. Each provided multimedia asset is provided to a content compressor denoted by reference numeral 102 for processing.

This content compressor generates multiple versions of each multimedia asset, by varying the target resolution and compression levels in accordance to the target client devices that the multimedia asset is intended to be delivered to. For example, if the target devices are televisions, then the set of resolution can be from 480p up to 4096p, and the compression levels can be specified by the bit rates, such as from 1 megabits/sec up to 30+ megabits/sec.

In FIG. 1 multiple versions, e.g., v1 and v2, are generated for the multimedia assets as respectively denoted by reference numerals 104 and 105. The versions generated are stored in a content catalog database denoted by reference numeral 103. The output of the content compressor 102 is thus a set of compressed files per input multimedia asset (e.g. 104 and 105) and is saved into the content catalog database 103.

It is then up to a client-side module denoted by reference numeral 110 to decide which multimedia asset, and which version for each multimedia asset, to download in order to optimize for that client's resource constraints.

The client-side module 110 is a software module with access to some amounts of local media storage denoted by reference numeral 119, and having, during the download phase, access to a network denoted by reference numeral 130. The main task for this module 110 is to transfer a subset of the content catalog database 103 via a server into its local media storage 119 for subsequent playback by a playback module denoted by reference numeral 120, while maximizing the overall content quality, as well as the number of items downloaded to maximize selection for the users.

This is achieved by first having a media ranker module denoted by reference numeral 111 query a server-side content consumption likelihood module denoted by reference numeral 113 for a list of items available within the content catalog database 103. The content consumption likelihood module 113 receives an identification of the multimedia items in the content catalog database 103.

In addition, the media ranker module 111 can either send along the user's consumption history stored locally in a local consume history module denoted by reference numeral 112, or send a user identifier for a server-side aggregate consume history module denoted by reference numeral 114 to look up that user's history. The task for the content consumption likelihood module 113 is to compute the likelihood of the input user for consuming each item within the content catalog database 103, based on the user's history as well as the aggregate consumption history of all users identified in module 114.

There are multiple approaches to computing the likelihoods, such as simply by the number of times each item has been consumed, i.e., popularity. More sophisticated recommendation algorithms such as collaborative filtering can be used to estimate the likelihoods, or content-based recommendation algorithms to calculate the similarity to the user's historical items to estimate the likelihoods. These algorithms are familiar to those in the art and are implementation dependent to be chosen by the implementers.

Estimating the likelihood of a user consuming each multimedia item preferably involves collecting a consumption history of multimedia items by individual users; and then generating a score for every combination of an item and a user of the system based on said consumption history.

Generating a score may comprise:
computing the number of times each item was consumed;
computing a score for each item based on how similar the consumption history of each user is to the consumption history of other users;
computing a score for each item based on how similar the consumption history of each item is to the consumption history of other items within said media catalog;
computing how similar each item is to other items within said media catalog; or
computing a single likelihood by combining said score based on number of times each item was consumed, said score based on how similar the consumption history of each user to other users, said score based on how similar the consumption history of each item to items, and said score based on how similar each item is to other items.

The item consumption likelihood module may be configured to perform the necessary computations to generate the score.

The output of the content consumption likelihood module 113 is a list of items from the content catalog database 103, as well as the numerical value for each item's likelihood of consumption by the user denoted by reference numeral 115. This data is returned to the client-side media ranker module 111, which can either present the list of items sorted by the most likely ones first to the user to select the items to download through a user input interface connected to a media downloader module denoted by reference numeral 118, or alternatively, automatically choose the items to download by a direct connection denoted by reference numeral 117 to the media downloader module 118.

The decision of which version of the media items to download is done by the media downloader module 118, which takes as input the list of items either selected by the user input module 116 or ranked by their likelihoods 117 as notified from the media ranker module 111, as well as the resource constraints on the user's device.

Specifically, these constraints may include one or more of the amount of free space available within media storage module 119 for storing the media items, the available bandwidth for transferring the files over the network, and the amount of time allotted for the transfer. These four inputs may be used to determine how many items, which items, and which version of the items to transfer to fit within the constraints.

An exemplary implementation determines resource constraints by collecting the maximum storage available on a client device of a user, and estimating the maximum bandwidth available of said client device of said user.

Determining resource constraints may comprises, in addition to any one of the determinations set out above, collecting the battery level available on a client device of the a user.

A constraint process is described in more detail below, and once the items and the versions are determined, the files are downloaded from the media catalog server database 103 to the device's local media storage module 119 for subsequent playback with the playback module 120.

When an item is consumed, this action is saved within the local consumption history database 112 or sent to the server for storage in the aggregate consume history module 114.

The entire process repeats the next time a user requests for new items to be downloaded, or can be done automatically on the client-side module 110 on behalf of the users.

Figure 2:
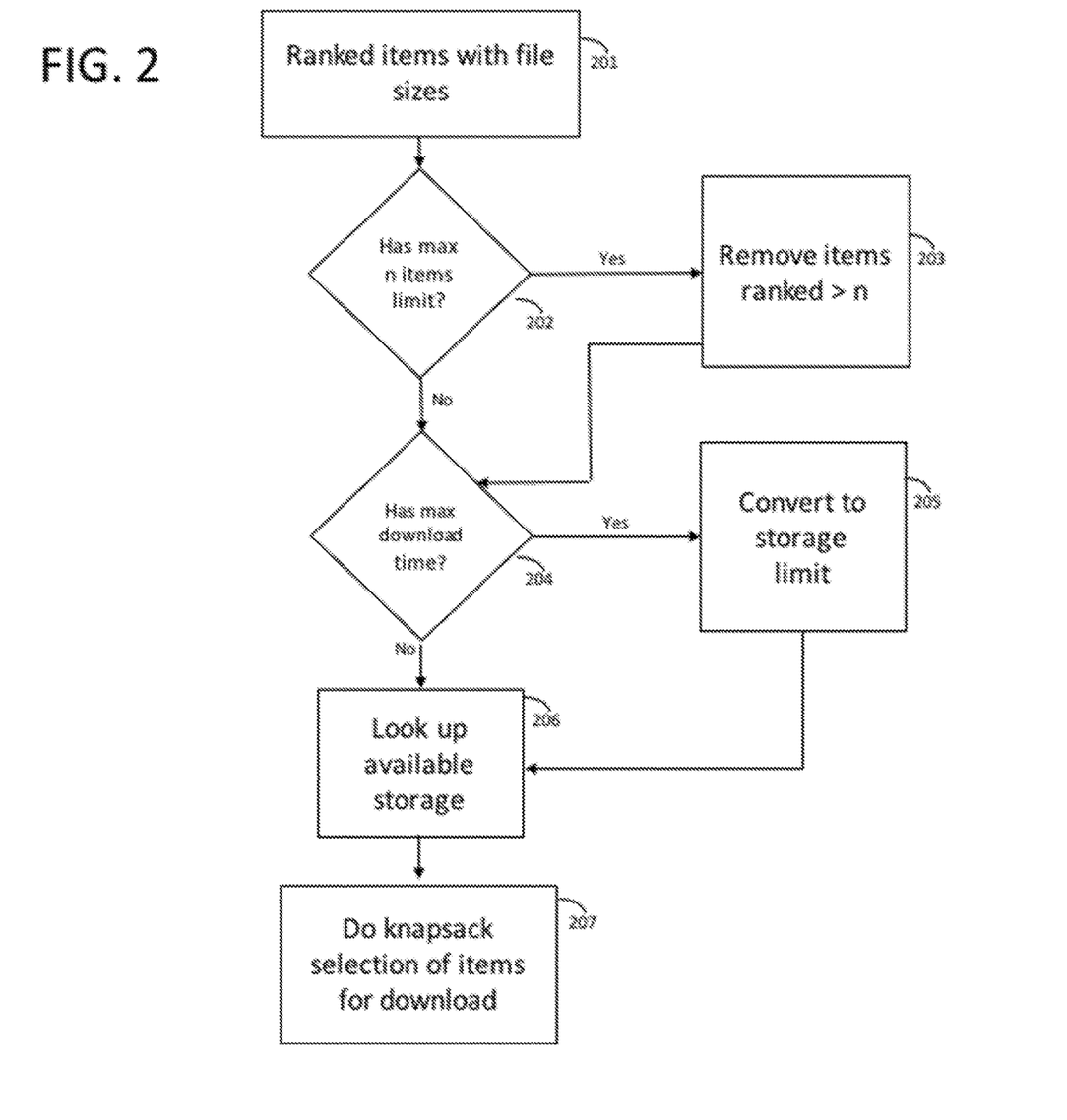
FIG. 2 is an exemplary flow chart which illustrates the manner in which the Media Downloader module processes its inputs.

FIG. 2 illustrates in flow chart form an exemplary manner in which the media downloader module 118 processes its inputs in accordance with the invention.

The main input to this module is a list of media items and metadata about the file sizes of each of their versions, denoted by step 201.

The first decision point is a determination as to whether there is a maximum n items limit in step 202. If yes, the input list is truncated to the top n items in step 203. If no, the entire input list is used for further processing.

The next decision point is a determination as to whether there is a maximum download time constraint in step 204. If yes, this is converted to effectively a storage limit by multiplying the maximum time with the available bandwidth during that time period in step 205. For example, if there is a 30 minute time limit, and the bandwidth is 8 megabits per second, then the maximum data that can be transferred is 14,400 megabytes, or 14.4 gigabytes.

The last step is to lookup the storage available of the user's device in a step 206, which is the final constraint needed to determine which items to download. Lastly, the minimum between the available storage and the transfer limit is used as the final downloading limit.

The output of these steps, which are the list of items and their associated file sizes and the downloading limit, are sent to an item download step 207, described in more detail below.

Figure 3:
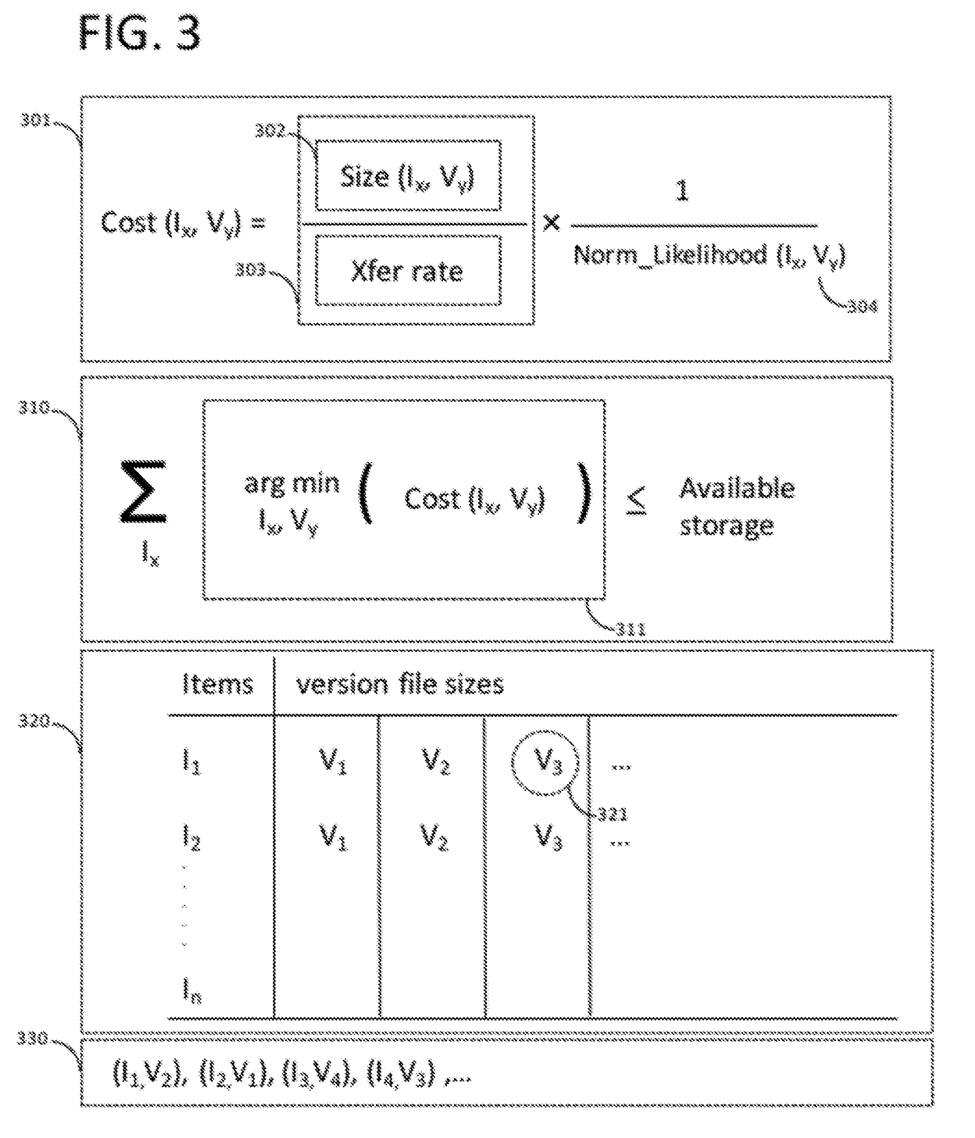
FIG. 3 illustrates an exemplary manner in which the decision of which titles to download is determined.

FIG. 3 illustrates the manner in which the decision of which items to download is processed in accordance with an example of the invention. This process is modelled as a cost minimization task that sums to be below the maximum cost threshold, while maximizing the number of individual items.

The first equation is an example of the cost function per item $cost(I_x, V_y)$ denoted by reference numeral 301, which estimates the relative cost to transfer a version ($V_y$) of an item ($I_x$) to the client device. In this example, the cost function is simply the file size of each version $size(I_x, V_y)$ denoted by reference numeral 302 divided by the bandwidth to estimate the amount of time needed for the transfer denoted by reference numeral 303. This term is multiplied by the inverse of the normalized likelihood of that item being consumed by the user Norm Likelihood($I_x$, $V_y$) denoted by reference numeral 304, the normalization being simply a range of values between 1 and an upper bound, with 1 being the lowest likelihood and 10 or 100 for the upper bound, varied based on the version $V_y$ as the higher quality, the higher this term since it would improve the likelihood of consumption. This second term (inverse of the normalized likelihood) acts as a discount of the download cost, such that the more likely an item is to be consumed, the more reduction in cost it receives since the potential benefit to the user is higher.

The second equation denoted by reference numeral 310 describes how the cost function is maximized across the items, while meeting the storage constraint. The inner term denoted by reference numeral 311 is to find the version $V_y$ across all items $I_x$ such that the overall cost function cost($I_x$, $V_y$) for the items are minimized. This equation can be implemented efficiently via dynamic programming techniques that are well known to those in the art. Lastly, each potential configuration of the items $I_x$ and associated versions $V_y$, the size of each size($I_x$, $V_y$) is summed across the items and checked to be lower or equal to the overall available storage constraint. If it is not satisfied, that potential configuration is invalidated.

This process is visualized in the table denoted by reference numeral 320, where each cell is the value of the cost function cost($I_x$, $V_y$) for the item $I_x$ and version $V_y$, e.g., cost($I_1$, $V_3$) for version 3 of item 1 denoted by reference numeral 321. The second equation denoted by reference numeral 310 effectively chooses one cell per row, sums all the cost function values down all rows, i.e., all items, and checks against the storage constraint. The combination that results in the highest number of items with the minimal overall cost while satisfies the constraint is the chosen combination, denoted by reference numeral 330.

The chosen configuration, which specifies which version $V_y$ of which item $I_x$ to download, is then processed by the downloader 118 to transfer the files for the items to the client's device and complete the process.

Examples and embodiments in accordance with the invention may be implemented as method processes in software. Such software may be stored on appropriate software storage media. Stored software, when executed on a computer, preferably performs a process in accordance with the described methods.

The invention has been described by way of examples, and is not limited to the specific examples given. Different parts of different examples may be combined. The invention is not limited to the specifics of any described example.

What is claimed is:

1. A multimedia processing method for downloading a best quality of one or more versions of one or more multimedia assets in its entirety to a single client device of a user, the method comprising:
    converting each of a set of multimedia assets into a plurality of compressed versions each version having a different compression level;
    storing the plurality of compressed versions of each multimedia asset of the set within a media catalog;
    estimating a likelihood of each of a plurality of users consuming each multimedia asset of the set based on: (i) an aggregate consumption history of multimedia assets in the media catalog for all of the users, and (ii) a consumption history for each of the plurality of users;
    generating a score for each multimedia asset for each of the plurality of users based on the likelihood;
    computing a set of multimedia assets to be downloaded for each user based in dependence of the score and in dependence on resource constraints, the resource constraints including:
    determining if there is a limit to a number of multimedia assets to download, and responsive to determining there is a maximum limit "n" for the number of multimedia assets to download, truncating the set of multimedia assets computed to be downloaded to "n" multimedia assets, and responsive to determining there is not a maximum limit "n" for the number of multimedia assets, providing the set of multimedia assets computed to be downloaded as an entire set of multimedia assets computed to be downloaded for further processing;
    determining if there is a maximum download time, and responsive to determining that there is a maximum download time, multiplying the maximum download time by an available bandwidth during that maximum download time to determine maximum data that can be transferred in the maximum download time;
    determining available storage at the user device;
    providing the truncated set or the entire set of multimedia assets for downloading and their compressed versions, and the maximum data;
    selecting for the client device best quality versions of the multimedia assets in the truncated set or the entire set for downloading in their entirety given the resource constraints, comprising:
        converting the resource constraints into a downloading limit;
        converting for each multimedia asset for each user, the compression version and a consumption likelihood of the multimedia asset by each user, into the score via a cost function; and
        evaluating all combinations of the score for multimedia assets and versions to maximize the number of multimedia assets to download while being within the downloading limit;
    downloading the selected best quality versions of the multimedia assets; and
    storing a record of consumed downloaded multimedia assets at the client device of each user.

2. The method of claim 1, wherein converting each of a set of multimedia assets into a plurality of compressed versions each having a different compression level comprises:
    determining a set of multimedia resolutions suitable for different target client devices;
    determining a set of data rates suitable for a network bandwidth of users of the different target client devices; and
    creating a compressed version of each input multimedia asset into the media catalog with each combination of resolution and data rate.

3. The method of claim 1, wherein estimating the likelihood of a user consuming each multimedia asset comprises:
    collecting a consumption history of multimedia assets by individual users; and
    generating a score for every combination of a multimedia asset and a user based on the consumption history of the user.

4. The method of claim 3, wherein generating a score further comprises one or more of:
- computing a number of times each multimedia asset was consumed;
- computing a score for each multimedia asset based on how similar the consumption history of each user is to the consumption history of other users;
- computing a score for each multimedia asset based on how similar the consumption history of each multimedia asset is to the consumption history of other multimedia assets within the media catalog;
- computing how similar each multimedia asset is to other multimedia assets within the media catalog; and
- computing a combined single likelihood score based on number of times each multimedia asset was consumed, the combined single likelihood score based on how similar the consumption history of each user to other users, on how similar the consumption history of each multimedia asset to multimedia assets, and on how similar each multimedia asset is to other multimedia assets.

5. The method of claim 1, wherein determining the resource constraints further comprises:
- collecting a battery level available on the client device of each user.

6. The method of claim 1, wherein downloading the multimedia asset further comprises:
- determining the multimedia assets and which compressed versions of each multimedia asset to download; and
- downloading from the media catalog the multimedia assets and versions.

7. The method of claim 6 further comprising storing the downloaded multimedia assets(s) into local storage of the client device of each user.

8. The method of claim 7 further comprising playing back the downloaded multimedia assets(s).

9. A non-transitory computer medium for storing computer program code which, when executed on a computer, performs the method of claim 1.

10. A multimedia processing device for downloading a best quality of one or more versions of one or more multimedia assets to a single client device of a user in its entirety, the multimedia processing device comprising:
- a content compressor for receiving a set of multimedia assets and converting each multimedia asset into a plurality of compressed versions each having a different compression level;
- a database for storing a media catalog comprising the plurality of compressed versions;
- a content consumption likelihood module for estimating a likelihood of each of a plurality of users consuming each multimedia asset based on (i) an aggregate consumption history of the multimedia assets within the media catalog, and (ii) a consumption history of each of the users; and
- a processor configured to:
  - generate a score for each multimedia asset for each of the plurality of users based on the likelihood;
  - compute a number of the multimedia assets to be downloaded for each user in dependence on the score, including determining whether there is a maximum limit "n" for the number of multimedia assets, and if so truncating the set to "n" multimedia assets, and if not providing the entire set of multimedia assets for further processing;
  - determine whether there is a maximum download time, and if so, multiply the maximum download time by available bandwidth during the maximum download time to determine maximum data that can be transferred;
  - provide a list of multimedia assets and their compressed versions, and the maximum data;
  - determine a version of the multimedia asset to download for each user compressed in dependence on resource constraints at a client device of each user, the resource constraints including the maximum download time, the available bandwidth, and available storage on the user device; and
  - download the determined compressed version of the multimedia assets to the client device of each user, such that the best quality versions of the multimedia asset are downloaded in their entirety given the resource constraints;
- wherein the content consumption likelihood module comprises:
  - a module for converting resource constraints into a downloading limit
  - a module for converting, for each multimedia asset, the compression version, the likelihood of the multimedia asset into a score via a cost function; and
  - a module for evaluating all combinations of the score for the multimedia assets and versions to maximize the number of multimedia assets to download while being within the downloading limit; and
- the multimedia processing device further comprising a store for storing a record of consumed downloaded multimedia assets to the client device of each user.

11. The device of claim 10, wherein the content compressor for converting the multimedia assets into a plurality of compressed versions each having a different compression level comprises:
- a module for determining a set of multimedia resolutions suitable for different target client devices;
- a module for determining a set of data rates suitable for a network bandwidth of users of the different target client devices; and
- a module for creating a compressed version of each input multimedia asset into the media catalog with each combination of resolution and data rate.

12. The device of claim 10, wherein the content consumption likelihood module for estimating the likelihood of each of the plurality of users consuming each multimedia asset comprises:
- a module for collecting a consumption history of multimedia assets by individual users; and
- a module for generating a score for every combination of a multimedia asset and a user based on the consumption history.

13. The device of claim 10, wherein the content consumption likelihood module for estimating further comprises:
- a module for collecting a battery level available on the client device of each user.

14. The device of claim 10, further comprising a module for determining the multimedia assets and which compressed versions of each multimedia asset to download; and
- a module for downloading from the media catalog for the multimedia assets and versions.

15. The device of claim 14 further comprising a store for storing the downloaded multimedia asset(s) into local storage of the client device of each user.

16. The device of claim 15 further comprising a playback module for playing back the downloaded multimedia asset(s).

* * * * *